United States Patent [19]

Hentschel et al.

[11] Patent Number: 4,767,535
[45] Date of Patent: Aug. 30, 1988

[54] MEMBRANES OF DIISOCYANATE ADDITION POLYMERS FOR HEMODIALYSIS AND/OR HEMOFILTRATION

[75] Inventors: Peter Hentschel, Laudenbach; Christof Josefiak, Erlenbach; Werner Klostermeier, Klingenberg, all of Fed. Rep. of Germany

[73] Assignee: Akzo NV, Arnhem, Netherlands

[21] Appl. No.: 899,932

[22] Filed: Aug. 25, 1986

Related U.S. Application Data

[63] Continuation of Ser. No. 692,953, Nov. 16, 1984, abandoned.

[30] Foreign Application Priority Data

Nov. 19, 1983 [DE] Fed. Rep. of Germany ....... 3341847

[51] Int. Cl.$^4$ ............................................. B01D 13/00
[52] U.S. Cl. .................................. 210/500.38; 55/158
[58] Field of Search ...................... 210/500.38; 55/158

[56] References Cited

U.S. PATENT DOCUMENTS 4,148,734 4/1979 Hilterhaus et al. ......... 210/500.38 X
4,284,506 8/1981 Tetenbaum et al. .......... 210/497.1 X

FOREIGN PATENT DOCUMENTS 73978   3/1983 European Pat. Off. .
2355073 5/1975 Fed. Rep. of Germany .
3127464 1/1983 Fed. Rep. of Germany .
3239318 5/1983 Fed. Rep. of Germany .
3149527 6/1983 Fed. Rep. of Germany .
1307979 9/1962 France .
1483414 8/1977 United Kingdom .

OTHER PUBLICATIONS

Merrill, E. W. et al, International application published under PCT, Pub. No. WO83/00695, Mar. 3, 1983.
Syzcher, M. et al, "Polyurethane Elastomers . . . ", Elastomerics, Mar. 1983, pp. 11–15.
Lyman, D. J. et al, "New Synthetic Membranes . . . ", Trans. Am. Soc. Artif. Int. Organs, 1965, vol. 11, pp. 91–94.
Klein et al, "Evaluation of Hemodialyzers . . . ", U.S. Dhew Pub. No. (NIH)77–1294, pp. 14–26.
Banks, J. E., *Naming Organic Compounds*, W. B. Saunders, Co., Philadelphia, PA, 1967, p.13.

Primary Examiner—Frank Sever
Attorney, Agent, or Firm—Michael J. Striker

[57] ABSTRACT

Membranes are disclosed which are suitable for hemodialysis and/or hemofiltration, prepared from aliphatic diisocyanates, particularly cycloaliphatic diisocyanate such as cyclohexane diisocyanate-(1,4), particularly the transisomer and at least one compound which displays two active hydrogen atoms. For the reaction a molar ratio of soft segment to hard segment from 0 to 0.20, particularly from 0 to 0.1, is employed. Serving particularly for construction of the hard segments are compounds such as hydrazine, ethylene diamine, ethylene glycol and butanediol-(1,4). It is recommended to prepare the addition polymer in the presence of a aprotic solvent and a dissolving coagent such as lithium chloride or calcium chloride. Polyethers such as polyethylene glycol are particularly suitable for construction of the soft segment. The membrane is characterized by an ultrafiltration rate of from 0.5 to 300, particularly 0.5 to 100 ml/h.m$^2$.Torr, and a dialytic permeability for vitamin B$^{12}$ of 0.5 to 20.10.$^{-3}$ cm./min.

6 Claims, No Drawings

MEMBRANES OF DIISOCYANATE ADDITION POLYMERS FOR HEMODIALYSIS AND/OR HEMOFILTRATION

This is a continuation of application Ser. No. 692,953 filed Nov. 16, 1984, now abandoned.

BACKGROUND OF THE INVENTION

The invention concerns membranes of diisocyanate addition polymers such as polyurethanes, and polyureas, for hemodialysis and/or hemofiltration, as well as a process for the manufacture thereof.

Hemodyalysis is a method by which determined substances such as urea, uric acid, creatinin, among others, are separated from the blood in the course of a so-called dialysis. Such a treatment is necessary for patients who have kidney insufficiency. During dialysis, the blood is led from a blood vessel through an artificial kidney in which it flows along a semi-permeable membrane. An appropriately-composed rinsing liquid is located on the other side of the membrane into which the toxic substances travel through the semi-permeable membrane. The cleaned blood is then led back to the body.

When patients who possess a kidney-insufficiency are not subjected to a dialysis treatment, also called a blood-washing, within determined intervals of time, the blood becomes so strongly enriched with these harmful substances that sooner or later, death occurs.

Previously, most membranes employed for a hemodialysis were of a cellulosic basis, namely membranes of regenerated cellulose, particularly Cuprophan ® membranes, which have been prepared according to the so-called cuproamine technique. Moreover, an entire series of hemodialysis membranes are still on the market constructed e.g. on the basis of cellulose acetate.

Cellulose membranes today belong to the standard membranes which work with a high degree of reliability and for the production of which so much experience has been meanwhile collected that this production is controlled with satisfactory certainty. The characteristics of these Cuprophan membranes can be readjusted reproducibly, and it is possible to obtain constant flow data, permeability values and selectivities. Cuprophan membranes have proven themselves in medical use. It has also been possible to collect much experience during the manufacture of modules and complete dialysis devices in which Cuprophan membranes are employed so that manufacture of such arrangements no longer causes principle difficulties. Accordingly, membranes based upon cellulose have been employed worldwide with great success for now up to 15 years, and very many patients have been aided in this manner, providing very extensive numerical material about hemodialysis with cellulose membranes, and in numberless publications hemodialysis with the employment of cellulose membranes is subjected to a critical analysis. Based upon this extensive material, and particularly also with evaluation of statistical tests, man is better equipped today to survey the situation as to what needs are still present concerning the employment of cellulose membranes and in what direction examinations should be made for possibilities for further improvements.

It has thus been shown that during dialysis treatment with cellulosic membranes, within the first hour of treatment so-called leukopenie occurs, i.e., a clear drop in the number of leukocytes is to be observed, which generally is only of a temporary nature and indeed, after a short time, returns by itself to the normal level.

In some scientific publications this leukopenie has been discussed in connection with so-called dialysis discomfort phenomena which, among others, is made conspicuous by a certain indisposed state of health of the patient.

It is, moreover, known that cellulose surfaces in contact with blood will activate the immune system of the body, i.e., a defense reaction is set in motion against the foreign surface. It would therefore, be advantageous to have available a membrane for dialysis which does not display this disadvantage, is thus biocompatible, in particular compatible with blood, which, however, simultaneously displays favorable dialytic characteristics. It has already been attempted to manufacture hemodialysis membranes from numerous synthetic polymers, which however, cannot be performed in practice be it that they do not possess the desired dialytic characteristics, such as permeability and selectivity, or be it that they are inferior to cellulose membranes with regard to their compatibility with blood.

Whereas, with hemodialysis the driving force for the separation process is a concentration difference, and the separation of the material occurs based upon a diffusion, the driving force with hemofiltration is a pressure difference. Since with hemofiltraton amounts of liquid are withdrawn from the blood which are again required by human blood circulation, it is necessary to provide corresponding amounts of electrolyte solution for reinfusion.

Dialysis depends mainly upon the diffusive characteristics of the membrane, in which connection, in addition to the specific characteristics of the membrane, such as polymeric construction, structure and the like, also the thickness of the membrane plays a role. During filtration, in contrast, it is mainly the hydraulic permeability of the membrane which is of significance, so that appropriate flow rates are assured. Those membranes which approach the required hemodialysis characteristics, generally have a smaller thickness which frequently lies at 30 μm and below.

For the combination of hemodialysis and hemofiltration, likewise membranes are employed with small thickness but significantly greater permeability than is the case for pure dialysis.

Upon hemofiltration, the membrane thickness is of less significance, particularly when through asymmetrical construction of the membrane high hydraulic permeabilities are obtained even with thicknesses of 100 μm. Such membranes are, however, on account of the great diffusion pathway, less suitable for dialysis.

It is known that polyurethanes are polymers which are biocompatible. Thus, M. Szycher and coworkers in "Elastomerics" March 1983, p.11, describe what role polyurethane can play in artificial hearts. Apart from several more generally held structural formulas and likewise generally held indications for the manufacture of polyurethanes from the most different starting materials, no concrete statements are given as to how the there-described polyurethane should be manufactured. However, the paper provides nothing about the manufacture of membranes which are suitable for hemodialysis and hemofiltration.

Indeed, a series of publications is known in which the employment of polyurethanes and polyureas is mentioned for the manufacture of hemodialysis membranes.

Thus, in FR-PS No. 1 307 979 are described an arrangement and a process for the treatment of solutions using semipermeable membranes. With the there-described separation operations, one can include the techniques such as osmosis, reverse osmosis, dialysis, ultrafiltration, among others. In addition, to polymers based upon cellulose, also numerous synthetic polymers, among others polyurethane, are generally mentioned. However, indications as to how these polyurethanes are supposed to be constructed and, in particular, as to how a hemodialysis membrane is supposed to be manufactured from polyurethanes are not to be withdrawn from this patent.

Lyman et al describe a series of membranes of polyurethane which are supposed to be suitable for hemodialysis in Trans. Amer. Soc. Artif. Int. Organs, 1965, vol.XI, pp. 91–94 and in Annals, New York Academy of Science, 146(1), pp. 113–118 (1968). The there-described polyurethanes are constructed on the basis of polyglycols, lower-molecular diols and diphenylmethane diisocyanate. It has, however, turned out that the statements made by Lyman are not sufficient in order to be able to manufacture membranes useful for daily employment. Thus, one cannot manufacture, reproducibly, membranes with uniform characteristics using the statements made in these references, in particular the stability of the there-described membranes leaves much to be desired. Upon a hydrolytic degradation of the polyurethane, aromatic amines can be produced, which are known for their toxicity and which it is presumed are included with the carcinogenic substances.

In the Japanese publication No. 81/37007 similarly constructed polyurethanes are described for the manufacture of dialysis membranes, which possess, however, the same disadvantages set forth above.

In DE-OS No. 2 355 073, a process is described for the manufacture of polyurethane solutions, whereby the polyurethane can be prepared from numerous starting materials. Microporous foils, which are prepared according to the teachings of DE-OS No. 2 355 073, are indeed suitable for microfiltration, but are, however, completely unsuitable for employment in hemodialysis and hemofiltration since they also pass through higher molecular substances characteristic of the body, such as proteins, which is undesirable.

When one works the Example 1 of DE-OS No. 2 355 073, using cyclohexane diisocyanate as aliphatic diisocyanate, one obtains only lower-molecular substances, insoluble in dimethylformamide. Also upon addition of hydrazine, is produced no solution because polyurethane precipitates. Whether or not already in the literature and in an entire series of patents, many indications are to be found to manufacture membranes from polyurethanes or polyureas, i.e., from polyaddition polymers, which also are supposed to be suitable for hemodialysis, there still exists a need for improved membranes for hemodialysis and/or hemofiltration, based upon biocompatible diisocyanate addition polymers, as well as for processes for their production.

SUMMARY OF THE INVENTION

It is, therefore, an object according to the present invention to make available membranes for hemodialysis and/or hemofiltration, from diisocyanate additon polymers which are biocompatible and cause no, or only slight, defense reactions of the blood during hemodialysis and/or hemo-filtration, which, compared to the known Cuprophan hemodialysis membranes, display likewise good or indeed, improved flow data, such as permeaability and selectivity, which can be employed for longer periods without becoming stopped up, which in other respects can be easily constructed into customary modules or complete hemodialysis plants or hemofiltration plants, and the employment of which during hemodialysis and/or hemofiltration is possible without substantial injury to the patients, which moreover, possess good mechanical characteristics such as strength, which can be sterilized without decreasing efficiency and which, based upon their construction, are visibly transparent and homogeneous.

It is also an object according to the present invention to make available membranes which are storable and handlable in dry state, which allow hemofiltration at relatively low pressures, with high plasma water flow rates, and the exclusion limits of which are such that protein losses are avoided. It is moreover, an object according to the present invention to make available a suitable process for the manufacture of such membranes.

These objects are attained according to the present invention, by means of a membrane of diisocyanate addition polymers for hemodialysis and/or hemofiltration, which are characterized by an addition product of aliphatic diisocyanates, and at least one compound which displays two active hydrogen atoms, with a molar ratio of soft segment to hard segment from 0 to 0.20 and ultrafiltration rate from 0.05 to 300, particularly 0.5 to 100 ml/h.m$^2$.Torr and a dialytic permeability for vitamin B$_{12}$ from 0.5 to $20.10^{-3}$ cm/min.

Preferably, the addition product displays a molar ratio of soft segment to hard segment from 0 to 0.10. The membranes according to the present invention possess in the range of the wavelengths of visible light, an isotropic, homogeneous structure. The addition polymer is preferably constructed from cyclo aliphatic diisocyanates, particularly from cyclohexane diisocyanate-(1,4), more particularly from transcyclohexane diisocyanate-(1,4). Polyethers with an average molecular weight from 200 up to 20,000 are particularly suitable as compounds which represent the soft segment. Preferably, a polyethylene glycol with an average molecular weight from 600 up to 4,000 is employed as polyether. Hydrazine, ethylenediamine, ethylene glycol and butane diol-(1,4) are very suitable for construction of the hard segment as compounds with two active hydrogen atoms. For manufacture of such membranes for hemodialysis and/or hemofiltration from diisocyanate addition polymers, a process is suitable according to the present invention which is thereby characterized in that one reacts an aliphatic diisocyanate with at least one compound which displays two active hydrogen atoms, and the reaction is performed with a molar ratio of soft segment to hard segment from 0 to 0.20, the addition polymer dissolved in a solvent is shaped, and then coagulated with the aid of a liquid which is not or is only a very poor solvent for the polymer, after which the obtained membrane is washed and, if necessary, dried. The reaction is preferably performed in a polar aprotic solvent. If hydrazine and/or aliphatic diamine are employed as compounds which display two active hydrogen atoms, the employment of a dissolving co-agent is particularly advantageous.

In a further advantageous embodiment of the process according to the present invention for the production of membranes for hemodialysis and/or hemofiltration of diisocyanate addition polymers, one reacts an aliphatic diisocyanate with a lower-molecular diol and polyglycols in the melt without employment of a solvent, whereby a molar ratio of soft segment to hard segment from 0 up to 0.20 is maintained, after which the obtained addition polymer is dissolved in a protic solvent, the solution is shaped and then coagulated with the aid of a liquid which is not at all or is only a very poor solvent for the polymer. The obtained membrane is washed and, if necessary dried. Particularly formic acid is employed therewith as protic solvent.

The solutions of the diisocyanate addition polymers are preferably shaped as 4 to 20% solution. Water or water-solvent mixtures are particularly suitable as coagulation liquids. As dissolving co-agent, particularly calcium chloride and lithium chloride are employed.

It is advantageous for the washed membrane, before the drying, to be stabilized with a solution of glycerin or polyethylene glycol.

The process according to the present invention is particularly suitable for the shaping of hemodialysis membranes and/or hemofiltration membranes in the form of hollow filaments.

For manufacture of the polyaddition polymers for the hemodialysis membrane, chemical reactions are performed which lead to linear polyaddition products, which have already been known for a long time. Thus, Bayer A. G. describes in "Angewandte Chemie", vol. 59, pp. 257–288 (1947) already the basis of the co-called diisocyanate polyaddition process. By reaction of diisocyanates with compounds which display OH-groups, are produced the so-called polyurethanes, whereas compounds with amino groups lead to polyureas.

The reaction of the aliphatic diisocyanate, particularly the cycloaliphatic diisocyanate, preferably the trans cyclohexane diisocyanate is preferably performed in a solvent, namely in an aprotic solent, i.e., in a solvent which itself possesses no reactionable active hydrogen atoms. Examples of such solvents are: dimethylformamide, dimethylsulfoxide, among others. Preferably, dimethylacetamide, and N-methylpyrrolidone are employed as solvents.

It is self-evident that the starting materials, namely, aliphatic diisocyanate and the compounds displaying active hydrogen atoms, as well as the solvent, are extensively water-free, since water can react with the diisocyanate and thus lead to side reactions. Amines and hydrazine, in contrast, react more quickly than water, so that e.g., hydrazine hydrate can be employed as compounds displaying active hydrogen atoms.

The aliphatic diisocyanate can be reacted with a single compound which possesses two active hydrogen atoms, in a single reaction step into the polyaddition product. A preferred example would be the reaction between trans cyclohexane diisocyanate and hydrazine. In place of hydrazine, also short-chain diamines, such as ethylenediamine, propylenediamine and so forth can be employed. Of the $NH_2$-group-displaying compounds, however, hydrazine is preferred. Such polyaddition polymers contain only hard segments and no soft segments.

Also short-chain diols, such as ethylene glycol, butylene glycol, and the like, can be employed for construction of the polyurethane. These polyurethanes also contain no soft segments.

The polyaddition product can also be constructed in such manner than one initially proceeds from a macromolecular compound, particularly so-called macrodiols, such as polyesters, polycarbonates, polyethers and the like, and by means of reaction with diisocyanate, initially constructs a so-called pre-adduct, which itself still possesses NCO-end groups. Suitable as macrodiols are particularly polyesters, whereby polyethylene glycol is preferred. Also polytetramethylene glycol is suitable. In order to obtain sufficient hard segments in the prepared polyaddition polymer, one can already employ diisocyanate in excess during the construction of the preadduct, so that upon the addition of the chain extender, such as hydrazine, sufficient hard segments are produced. It is also possible to operate without diisocyanate excess during the manufacture of the preadduct and then, during the chain-extending, in addition to the compound with two active hydrogen atoms, e.g., hydrazine, to co-employ diisocyanate, in order to obtain the sufficient number of hard segments.

The NCO-group-displaying pre-adduct is then reacted with a chain-extender into the prepared polyaddition product. As chain extender, preferably hydrazine is employed. It is also possible, however, to use short-chain diols or short-chain diamines as chain-extender.

It has proven to be favorable, upon manufacture of the polyurethane, to co-employ a so-called dissolving co-agent in addition to the abovementioned solvent. Such dissolving co-agents include, among others, inorganic salts, such as calcium chloride or lithium chloride which can be co-employed in amounts up to about 1–10%. This presence of dissolving co-agent promotes not only the solubility of the produced polyaddition product, but also the formation of the membranes and thereby contributes to the membranes' possessing the outstanding structures which are accessible according to the invention.

A dissolving co-agent is particularly indicated when hydrazine or a diamine is employed as compound with two active hydrogen atoms, which is used for construction of the hard segments. A dissolving co-agent is not unconditionally necessary when one employs an aliphatic diol such as ethylene glycol or butanediol-(1,4) for chain-extending. The dissolving co-agent is indicated whether or not one co-employs for construction of the polyaddition polymer, a compound which represents a soft segment.

According to a further advantageous embodiment of the process according to the present invention, one can manufacture the polyaddition polymer without employment of a solvent. Therewith aliphatic diisocyanates, aliphatic diols as so-called chain-extender and polyglycols (polyether) as soft segment-providing compounds, are employed. The polyaddition can be performed in substance, i.e., in the melt, whereby the reaction must be performed with a molar ratio of soft segment to hard segment from 0 to 0.20. The prepared polyurethane is then dissolved in a protic solvent, whereby in particular, formic acid is preferred.

The manufactured polyaddition polymer solutions can be worked up in concentrations from about 4 to 50%. Preferably, however, concentrations from 4 to 20% are used.

The prepared polymer solution is then shaped. This can proceed e.g., in such manner that the polymer solution is stretched into a film upon a support, and the support, together with the film, is rinsed.

Preferably, the polymer solution is shaped using a nozzle instrument, whereby one employs, indeed according to the desired shape of the membrane, a slit nozzle, a tube nozzle or a hollow filament nozzle. The polymer solution is preferably extruded directly into the coagulation liquid by means of the nozzle.

Preferably, suitable as coagulation liquid is water, which does not dissolve the addition polymer, however, which is miscible with the employed solvents such as dimethylsulfoxide, dimethylformamide, dimethylacetamide and N-methylpyrrolidon. In place of pure water, also mixtures of water and solvents, particularly the solvents which have been mentioned above, can be employed.

The membrane is washed after its solidification and can be stored in moist state.

It is expedient for the washed membrane, before the drying to be subjected to a stabilization treatment, which is composed of treating for example with a solution of glycerin or polyethylene glycol. Suitable in particular as solvent for glycerin or polyethylene glycol are liquids miscible with water, such as ethanol and water itself.

The membrane can then be dried at room temperature or at increased temperature, e.g., 65° C.

The dried membrane is storage-stable and can be employed at a later point in time, in simple manner, for hemodialysis and/or hemofiltration.

It was particularly surprising that the membranes according to the present invention distinguish from the known polyurethane or polyurea membranes through outstanding hemodialysis and hemofiltration characteristics. Thus, the hydraulic permeability is satisfactory, and the permeability for vitamin $B_{12}$ is very favorable. On the other hand, membranes according to the present invention allow no higher-molecular protein substances to pass through, so that e.g., during hemodialysis actually only the toxic substances are withdrawn and no compounds such as albumin and the like are removed from the blood.

The membranes distinguish by good biocompatibility, particularly good blood compatibility, so that disadvantages which occur upon the employment of membranes based upon cellulose and also recorded with other completely synthetic membranes do not occur. It should be emphasized that the permeability during the hemodialysis and/or hemofiltration is extensively constant and the selectivity does not shift in the direction of compounds of lower molecular weight.

By "hard segment" in the sense of the present invention is to be understood the molar employment amount of diisocyanate and short-chain chain-extender such as hydrazine, ethylene diamine, ethylene glycol and the like. Thus, for example, a polyurethane, which is constructed from 10 Mol diisocyanate, 19 Mol hydrazine and 1 Mol polyethylene glycol, possesses 19 hard segments and 1 soft segment, a molar ratio of soft segment to hard segment of 1:19=0.053.

Preferably, upon construction of the polyaddition polymer, in total about stoichiometric amounts of isocynate groups are employed relative to the active hydrogen atoms of the chain-lengthener and the macrodiols. It is indeed possible to work with a diisocyanate excess or deficiency; however, generally the excess or deficiency should not amount to more than 5%.

The membranes according to the present invention for hemodialysis and/or hemofiltration distinguish among others by a very favorable ultrafiltration rate, which is frequently designated also as hydraulic permeability. The ultrafiltration rate of the membranes is determined by means of measurement of the liquid volume which at a given pressure difference, at a temperature of 37° C., passes through the membrane through a membrane surface fixed to the apparatus, and which is normalized for general comparability, to surface unit, time unit and pressure unit. As liquid for determination of the ultra-filtration rate, water is employed. The method is described, among others, in "Evaluation of Hemodialyzers and Dialysis Membranes", of the U.S. Department of Health, Education and Welfare, DHEW Publication No. (NIH) 77-1294, pp. 24-26.

The membranes according to the present invention possess, in other respects, a good dialytic permeability and are, therefore, very suitable for removal of the toxic, harmful substances from the blood, without therewith promoting a loss of valuable higher-molecular substances such as proteins. The dialytic permeability is a measure for the permeability of the membranes with regard to dissolved substances and is dependent, aside from the membrane, upon the molecular weight of the dissolved substances. As test substance for the uremia poisoning in the range of an average molecular weight from 500-3,000, for a determination of the suitability of the membrane, a solution of 100 mg/l vitamin $B_{12}$ is employed for determination of the average molecular permeability. What is measured is the diffusive pressureless change in concentration of two differently concentrated starting solutions at both sides of the membrane with time. The method is likewise described in "Evaluation of Hemodialyzers and Dialysis Membranes" of the U.S. Department of Health, Education and Welfare, DEHW Publication No. (NIH) 77-1294, pp. 14 and 15, for the measurement with flat and tube membranes, and p. 20 for the measurement with hollow fibers.

Very significant for the use possibilities of the membrane during hemodialysis is also the diffusive permeability of urea, one of the main toxic substances in the blood of patients suffering from a kidney insufficiency. The diffusive permeability for urea of the membranes according to the present invention lies generally in a range from 10 up to $200.10^{-3}$ cm/min., particularly in the range from 20 to $100.10^{-3}$ cm/min.

The membranes according to the present invention are, therefore, suitable, based upon their dialytic characteristics, in outstanding manner for the performance of hemodialysis. They are distinguished optically by a pleasing appearance, particularly since they appear to the eye to be completely homogeneous and substantially transparent and without structure. They can be employed not only with pure dialysis which is run with no or only slight pressure difference, but likewise with hemofiltration, with which a higher pressure is employed than is the case with hemodialysis. They are particularly useful for all objects which are supposed to be solved by hemofiltration, namely, the separation of substances in the range from 2,000 and 3,000 Dalton molecular weight, which are responsible for uremic intoxication. On the other hand, the exclusion limits of the membranes are so favorable that protein losses are avoided during the hemofiltration.

The novel features which are considered characteristic for the invention are set forth in particular in the appended claims. The invention itself, however, both as to its construction and its method of operation, together with additional objects and advantages thereof, will be best understood from the following description of the specific embodiments.

DESCRIPTION OF THE PREFERRED EMBODIMENTS

EXAMPLE 1

Preparation of a Polymer Solution

Initially, a pre-polymer is prepared from polyethylene glycol 1500 and trans-1,4-cyclohexane diisocyanate, 180 g. (0.12 Mol) polyethylene glycol 1500 are dewatered in a 6 liter round flask at 100° C. and about 1 Torr for 1 hour, and thereupon 60 g. (0.36 Mol) trans-1,4-cyclohexane diisocyanate are added, followed by heating to 120° C. for 1 hour with stirring. After the reaction, 3 liters dimethylacetamide are added without further heating, and the residual amount of cyclohexane diisocyanate (862 g=5.04 Mol) is added, which dissolves quickly.

For preparation of the polymer solution, 5.5 l. dimethylacetamide are provided, together with 440 g. LiCl in a 15 l refined steel reactor with stirrer. After dissolving of the LiCl, 246 g. (4.92 Mol) hydrazine hydrate are added and subsequently, with stirring, the pre-polymer solution is dripped in. The temperature of the solution is held to between 16°-20° C. In the course of 1.5 hours, 90% of the stoichiometric amount is dosed in. The residual amount of pre-polymer solution is diluted with 400 ml. dimethylacetamide and within a further 1.5 hours, 4% of the stoichiometric amount is added. With the dosing, the course of the reaction is indicated by a rising viscosity. The solution is pumped in circulation from the reactor through a 2 mm wide and 50 mm long capillary and then back into the reactor, with a delivery efficiency of 55 g/min. The residual of pre-polymer solution is so added during the course of about two hours until the drop in pressure in the capillary amounts to about 13 bar, and therewith the desired molecular weight is obtained. The subsequently measured reduced viscosity of a 0.5% polymer solution in dimethylacetamide with 5% LiCL at 25° C. provides a value of $2.1.10^{-2}$ ml/g which corresponds to a average molecular weight of 220,000.

EXAMPLE 2

Preparation of a Polymer Solution

Trans-1,4-cyclohexane diisocyanate is worked up with hydrazine, without addition of PEG, directly into a polymer solution.

In a 50-liter refined steel reactor, 15 liters dimethylacetamide with 5% LiCl are provided, after which 550 g. (11 Mol) hydrazine hydrate are added, with stirring. Thereafter, a solution of 1826 g. trans-1,4-cyclohexane diisocyanate (11 Mol) in 6 liters dimethylacetamide is added dropwise, and under stirring the solution temperature is held at 16°-20° C. Within 1.5 hours, 90% of the solution is dosed. The residual cyclohexane diisocyanate solution is further diluted with about 1 liter dimethylacetamide and 4% of the stoichiometric amount of cyclohexane diisocyanate is added as solution within 1.5 hours. The course of the reaction is followed by means of pumping of the solution through a 2 mm wide and 50 mm long capillary with a delivery efficiency of 55 g/min., and still so much cyclohexane diisocyanate solution is added until a pressure drop in the capillary of 13.9 bar is attained.

EXAMPLE 3

Preparation of a Dialysis Membrane

The polymer solution prepared in Example 1 is filled into supply container above a spinning apparatus, and subsequently degassed. The solution is promoted with the aid of a gearwheel pump through a plate sieve and 20 μm. fuji filter (a refined steel candle filter) into a slit nozzle with a nozzle slit that is 250 mm broad and 100 μm. wide. The delivery amount comes to 50 g polymer solution per minute.

The nozzle is immersed into a water bath at 28° C., where the polymer solution is cast in vertically downwardly. There arises a clear, transparent film, which after about 90 cm. is directed about a roller at a discharge velocity of 3.5 m/min., and then washed solvent-free in a subsequent washing stretch with several further deflection rollers within about 4 minutes. The wet membrane is then rolled onto a spool.

For drying, the wet membrane is initially transported through a bath of 30% glycerin, 60% ethanol and 10% water, and then placed on a polyester conveyer band which runs at a 1 m/min. velocity through a 5 m. long hot air dryer. The drying temperature amounts to 65° C. Subsequently, the dry membrane is rolled up.

The so-obtained membrane is clear, transparent, and uniform. Its width amounts to 14.5 cm and its thickness 17 μm. The measurement of the ultrafiltration rate with water provides a value of 3.1 ml/h.$m^2$.Torr, and the vitamin $B_{12}$ permeability amounts to $3.4.10^{-3}$ cm./min. These measurements are performed at 37° C.

EXAMPLE 4

Preparation of a Dialysis Membrane

The polymer solution prepared in Example 2 is worked up into a dialysis membrane in the same manner as in Example 3. A clear, transparent, uniform membrane is obtained with a width of 15.0 cm. and a thickness of 12 μm. The ultrafiltration rate with water is 2.1 ml/h.m$^2$.Torr and the vitamin $B_{12}$ permeability is $2.8.10^{-3}$ cm./min.

EXAMPLE 5

27.25 g (103.9 mMol) dicyclohexyl-methylene-diisocyanate (designation mark DESMODUR W) are stirred with 15.10 g (15.1 mMol) polytetramethylene glycol 1000 at 120° C. for 1 hour, and subsequently 8.0 g (88.8 mMol) 1,4-butanediol are added dropwise, whereby an increasingly viscous melt is produced. Upon cooling down, the melt solidifies into a clear, glasslike mass, which can be dissolved in 450 g formic acid in about 0.5 hours with stirring. The so-obtained viscous polymer solution is shaped by means of a wiper onto a glass plate into a 100 μm thick film, and then coagulated in a water bath, whereby a clear membrane about 20 μm thick is obtained. The measurement of the ultrafiltration rate with water at 37° C. provides for this membrane a value of 29.3 ml/h.m$^2$.Torr.

EXAMPLE 6

A polymer solution is prepared as in Example 1 from 60 g (0.10 Mol) polyethylene glycol 600, 119.52 g (0.72 Mol) trans-1,4-cyclohexane diisocyanate and 31.04 g (0.62 Mol) hydrazine hydrate as polymer starting materials and 1895 g dimethylacetamide with 94.7 g LiCl as solvent. For characterization of the polymers, the reduced viscosity of a 0.5% solution in dimethylacetamide with 5% LiCl is measured at 25° C., and a value of $2.5.10^{-2}$ ml/g is obtained, which corresponds to an average molecular weight of 280.000.

This polymer solution is worked up into a dialysis flat membrane corresponding to Example 3, and a 14 cm wide, 17 μm thick membrane is obtained. The membrane is clear, transparent and uniform. A measurement of the ultrafiltration rate with water provides at 37° C. a value of 2.4 ml/h.m$^2$.Torr and a vitamin B$_{12}$ permeability amounts at 37° C. to 3.9.10$^{-3}$ cm./min.

EXAMPLE 7

The polymer solution prepared in Example 2 is worked up into a dialysis membrane in the same manner as in Example 3. In this case, however, from a portion of the wet rolled up membrane, without drying, the ultrafiltration rate with water and the vitamin B$^{12}$ permeability at 37° C. are measured, and values of 28.4 ml/h.m$^2$.Torr and 11.6.10$^{-3}$ cm./min. are obtained.

A further portion of the wet membrane, before drying, is lead through a bath of 30% polyethylene glycol 1500 in water, and subsequently the ultrafiltration rate and vitamin B$^{12}$ permeability are measured under the same conditions. Values of 8.1 ml/h.m$^2$.Torr and 7.8.10$^{-3}$ cm./min. are obtained.

EXAMPLE 8

The polymer solution prepared in Example 1 is shaped into a hollow fiber. For this purpose a ring nozzle with a ring diameter of 1150 μm and a needle for dosaging of the lumen-filling liquid, having a diameter of 850 μm are employed.

Through the outer ring slit 0.85 g/min. of the polymer solution and through the needle opening 0.5 g/min. of a lumen filler, isopropyl myristate, are dosed. The nozzle exit is placed about 0.5 cm above the precipitation bath of water and the produced fiber is spun into the water bath and withdrawn at a velocity of 5.5 m/min. After a washing stretch with water of about 25 m., the fiber is led through a bath of 40% glycerin in water and subsequently, with constant velocity through a 5 m. hot air dryer at 50° C. Thereafter follows a dry stretch over 6 rollers (diameter 40 cm.) heated to 70° C. The so-dried fiber can then be rolled up onto a spool.

The fiber dimensions can be determined microscopically from the cross-section. The hollow fiber has an outer diameter of 570 μm. with a wall thickness of 32 μm.

For measurement of the ultrafiltration rate and the vitamin B$^{12}$ permeability, bundles of 50 fibers of length about 25 cm. are prepared from the hollow fiber, which are embedded at their ends into a polyurethane casting compound. After hardening of the polyurethane and cutting free of the hollow fiber ends, the lumen filler is removed with a solvent such as a fluorochlorohydrocarbon, and the bundle is rinsed with water to measure the ultrafiltration rate and vitamin B$^{12}$ permeability.

The measurement of ultrafiltration rate and vitamin B$^{12}$ permeability follows in suitable manner corresponding to that of flat membranes, and provides values of 6.3 ml/h.m$^2$.Torr and 3.9.10$^{-3}$ cm./min.

EXAMPLE 9

38.5 g (25.7 mMol) polyethylene glycol 1500 are dried in a glass flask at 100° C. and 5 Torr for 1 hour. Thereafter, it is heated to 120° C. and 183.5 g (1.105 Mol) trans-1,4-cyclohexane diisocyanate are added for preparation of the pre-polymer, and stirred for 1 hour. The mixture can then be cooled to about 80° C., whereupon 500 g N-methylpyrrolidon are added in which the pre-polymer dissolves.

For preparation of the polymer solution, 1350 g N-methylpyrrolidon with 140 g LiCl and 49.1 g (0.981 Mol) hydrazine hydrate are provided in a 5-liter refined steel reactor with stirrer and jacket-cooling. Under good stirring, at a temperature between 18°–24° C., the pre-polymer solution is added dropwise. The rise in solution viscosity is followed as in Example 1 by means of a repumping apparatus and the viscosity is so controlled that the pressure drop in the capillary at 18° C. amounts to 19.8 bar. Determination of the reduced viscosity as 0.5% solution in dimethylacetamide with 5% LiCl provides a value of 4.7.10$^{-2}$ ml/g, which corresponds to an average molecular weight of about 500,000.

This polymer solution is shaped into a hollow fiber as in Example 8. 0.82 g/min. polymer solution and 0.5 g/min. of a paraffin of the trade designation Essomarcol 52 as lumen-filler are promoted with a discharge velocity of 10 m/min. After the coagulation of the fiber in water at room temperature, it is washed solvent-free over a stretch of about 25 m. and subsequently, led through a bath of 40% polyethylene glycol 600 in water. The drying follows at 48° C. in a hot air dryer and 62° C. in a roller dryer (see Example 8).

The dry hollow fiber has an outer diameter of 300 μm with a wall thickness of 10–12 μm. A hollow fiber bundle prepared therefrom displays a ultrafiltration rate of 2.0 ml/h.m$^2$.Torr and a vitamin B$^{12}$ permeability of 2.6.10$^{-3}$ cm./min.

EXAMPLE 10

360 g (0.24 Mol) polyethylene glycol 1500 are dewatered in a 10-liter glass flask under stirring at 110° C. and 1 Torr for 1 hour. After heating to 120° C., 1724 g (10.4 Mol) trans-1,4-cyclohexane diisocyanate are added, and stirred for 2 hours. Thereafter, the heating is terminated and during the cooling down at about 90° C., 7320 g dimethylacetamide are added, which dissolves the pre-polymer.

For polymerization, in a 50-liter refined steel reactor with stirrer and jacket-cooling, 10,378 g dimethylacetamide, 1480 g LiCl and 492 g (9.83 Mol) hydrazine hydrate are provided with stirring. The pre-polymer solution is then added at 18°–24° C. and the rise in viscosity is followed with the aid of a repumping apparatus (see Example 1). At a pressure drop in the capillary of 20 bar, the addition is ended and the polymer solution is drained off. The determination of the reduced viscosity as 0.5% solution in dimethylacetamide with 5% LiCl at 25° C. provides a value of 3.1.10$^{-2}$ ml/g, which corresponds to an average molecular weight of 430,000.

8390 g of this solution are diluted with a mixture of 3356 g dimethylacetamide with 168 g LiCl to a polymer concentration of 8%. This solution is promoted from a storage container through a 20 μm plate and 10 μm fuji filter into a nozzle with a nozzle slit of 500 mm breadth and 80 μm width. The delivery efficiency amounts to 80 g/min. polymer solution. The nozzle is immersed into a water bath of 26° C., into which the polymer solution is cast vertically downwardly. At a discharge velocity of 3.5 m/min., the membrane is deflected over a roller after about 90 cm., and then washed in a subsequent water bath with several further deflection rollers within a period of 4 minutes until it is solvent-free. The wet membrane is then rolled onto a spool.

For drying, the wet membrane is initially led through a bath of 40% polyethylene glycol 600 in water, wiped off, and then placed on a polyester conveyor band, which is led at 1 m/min. through a 5 m long warm air dryer. The dry air temperature amounts to 52° C. Subsequently the dry membrane is rolled up.

The so-obtained membrane is clear, transparent and uniform. Its breadth amounts to 31 cm. and its thickness 10 μm. The measurement of the ultrafiltration rate with water at 37° C. provides a value of 12.7 ml/h.m$^2$.Torr and the vitamin B$^{12}$ permeability amounts at 37° C. to $14.1.10^{-3}$ cm./min.

It will be understood that each of the elements described above or two or more together, may also find a useful application in other types of membranes differing from the types described above.

While the invention has been illustrated and described as embodied in membranes of diisocyanate addition polymers for hemodialysis and/or hemofiltration, it is not intended to be limited to the details shown, since various modifications and structural changes may be made without departing in any way from the spirit of the present invention.

Without further analysis, the foregoing will so reveal the gist of the present invention that others can, by applying current knowledge, readily adapt for various applications without omitting features, that, from the standpoint of prior art, fairly constitute essential characteristics of the generic or specific aspects of this invention.

What is claimed as new and desired to be protected by Letters Patent is set forth in the appended claims.

We claim:

1. Membrane of diisocyanate addition polymer, comprising means for hemodialysis or hemofiltration including, an addition product of aliphatic open-chain or aliphatic cyclic diisocyanate and at least one compound selected from the group consisting of hydrazine, ethylene diamine and propylene diamine, said addition product having a molar ratio of soft segment to hard segment from 0 to 0.20, said membrane having an ultrafiltration rate from 0.5 to 100 ml/h.Torr, a dialytic permeability for vitamin B 12 from 0.5 to $20.10^{-3}$ cm/min and an isotropic, homogeneous structure when examined visually.

2. The membrane according to claim 1, comprising an addition product with a molar ratio of soft segment to hard segment from 0 to 0.10.

3. The membrane according to claim 1, comprising an addition polymer of cyclohexane diisocyanate-(1,4).

4. The membrane according to claim 1, comprising an addition polymer of trans-cyclohexane diisocyanate-(1,4).

5. The membrane according to claim 1, comprising an addition product having a soft segment based upon polyether with an average molecular weight of from 200 up to 20,000.

6. The membrane according to claim 1, comprising as polyether, polyethylene glycol with an average molecular weight of from 600 up to 4,000.

* * * * *